United States Patent
Okada

(10) Patent No.: US 6,864,992 B1
(45) Date of Patent: Mar. 8, 2005

(54) NETWORK SYSTEM, METHOD AND COMPUTER READABLE MEDIUM INCLUDING PRINT LOG GENERATION

(75) Inventor: Yasushi Okada, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 989 days.

(21) Appl. No.: 09/598,937

(22) Filed: Jun. 22, 2000

(30) Foreign Application Priority Data

Jun. 25, 1999 (JP) .......................................... 11-179306

(51) Int. Cl.⁷ ............................................. G06K 15/00

(52) U.S. Cl. .................................... 358/1.15; 358/1.13

(58) Field of Search ................................ 358/1.1, 1.13, 358/1.14, 1.15, 504, 404; 709/224, 250, 203; 710/15; 714/47, 46, 39, 20, 723

(56) References Cited

U.S. PATENT DOCUMENTS 5,537,550 A * 7/1996 Russell et al. .............. 709/224

* cited by examiner

*Primary Examiner*—Arthur G. Evans
(74) *Attorney, Agent, or Firm*—Oblon, Spivak, McClelland, Maier & Neustadt, P.C.

(57) ABSTRACT

A network system includes at least one computer server and at least one client computer having a printer respectively connected to a network. The system has a print log generating device that generates a print log having printer usage contents including software used by the at least one client computer when a printing request is made in the at least one client computer. A print log storing device stores the print log, a collecting device collects the print log from the at least one client computer, and an aggregating device aggregates usage contents of the printer per a prescribed category. The print log generating device and the print log storing device are provided in the at least one client computer, and the collecting device is provided in the at least one computer server.

21 Claims, 18 Drawing Sheets

Fig. 13

| Department 1 | User | Printer A | | | | Printer B | Total |
|---|---|---|---|---|---|---|---|
| | | Full-Color | | Mono-Color | | Mono-Color | |
| | | A3 | A4 | A4 | | A4 | |
| | | Simplex | Simplex | Simplex | Duplex | Simplex | |
| Third Development Department | A | 10 | 2 | 28 | 28 | 34 | 102 |
| | B | 98 | 0 | 24 | 20 | 77 | 219 |
| | C | 41 | 0 | 20 | 2 | 65 | 128 |
| | D | 98 | 0 | 4 | 40 | 77 | 219 |
| | E | 15 | 0 | 19 | 19 | 45 | 98 |
| | F | 15 | 0 | 19 | 19 | 45 | 98 |
| | G | 23 | 0 | 15 | 10 | 54 | 102 |
| | H | 56 | 0 | 17 | 17 | 12 | 102 |
| | I | 54 | 0 | 23 | 0 | 25 | 102 |
| | J | 0 | 0 | 63 | 0 | 65 | 128 |
| Third Development Department Total | | 410 | 2 | 232 | 155 | 499 | 1298 |

Fig. 14

| Printer Name | Department 1 | User | Full-Color A3 Simplex | Full-Color A4 Simplex | Mono-Color A3 Duplex | Mono-Color A4 Duplex | Total |
|---|---|---|---|---|---|---|---|
| Printer A | Third Development Department | A | 10 | 28 | 2 | 28 | 68 |
| | | B | 98 | 20 | 0 | 24 | 142 |
| | | C | 41 | 2 | 0 | 20 | 63 |
| | | D | 98 | 40 | 0 | 4 | 142 |
| | | E | 15 | 19 | 0 | 19 | 53 |
| | | F | 15 | 19 | 0 | 19 | 53 |
| | | G | 23 | 10 | 0 | 15 | 48 |
| | | H | 56 | 17 | 0 | 17 | 90 |
| | | I | 54 | 0 | 0 | 23 | 77 |
| | | J | 0 | 0 | 0 | 63 | 63 |
| | Third Development Department Total | | 410 | 155 | 2 | 232 | 799 |
| | Fourth Development Department | USER A | 10 | 5 | 10 | 5 | 30 |
| | | USER B | 5 | 5 | 5 | 5 | 20 |
| | | USER C | 10 | 10 | 10 | 10 | 40 |
| | Fourth Development Department Total | | 25 | 20 | 25 | 20 | 90 |
| Printer A Total | | | 435 | 175 | 27 | 252 | 889 |

Fig. 15

| Department 1 | User | Word Processor A | | | | Table Calculation B | | Total |
|---|---|---|---|---|---|---|---|---|
| | | A3 | | A4 | | A4 | | |
| | | Simplex | Duplex | Simplex | Duplex | Simplex | Duplex | Total |
| Third Development Department | A | 10 | 5 | 34 | 2 | 28 | 8 | 87 |
| | B | 98 | 2 | 77 | 8 | 24 | 1 | 210 |
| | C | 41 | 3 | 65 | 1 | 20 | 3 | 133 |
| | D | 98 | 0 | 77 | 0 | 4 | 5 | 184 |
| | E | 15 | 1 | 45 | 2 | 19 | 12 | 94 |
| | F | 15 | 2 | 45 | 3 | 19 | 2 | 86 |
| | G | 23 | 0 | 54 | 5 | 15 | 3 | 101 |
| | H | 56 | 3 | 12 | 1 | 17 | 8 | 97 |
| | I | 54 | 5 | 25 | 2 | 23 | 0 | 109 |
| | J | 0 | 1 | 65 | 3 | 63 | 0 | 132 |
| Third Development Department Total | | 410 | 22 | 499 | 28 | 232 | 42 | 1233 |

Fig. 16

| | Printer A | | | | Printer B | | Total |
|---|---|---|---|---|---|---|---|
| | Full-Color | | Mono-Color | | Mono-Color | | |
| | A3 | A4 | A4 | | A4 | | |
| Time Zone Name | Simp-lex | Simp-lex | Simp-lex | Dup-lex | Simp-lex | Dup-lex | |
| Before Business | 0 | 0 | 0 | 0 | 0 | 3 | 3 |
| Before Noon | 1 | 2 | 5 | 1 | 1 | 2 | 12 |
| Lunch Time | 0 | 0 | 0 | 0 | 0 | 1 | 1 |
| After Noon | 10 | 3 | 2 | 1 | 1 | 10 | 27 |
| After Business | 2 | 1 | 5 | 2 | 1 | 2 | 13 |
| Night Time | 1 | 3 | 0 | 0 | 0 | 1 | 5 |
| Total | 14 | 9 | 12 | 4 | 3 | 19 | 51 |

Fig. 17

|  | Printer A | | | | Printer B | |
| --- | --- | --- | --- | --- | --- | --- |
|  | Full-Color | Mono-Color | | | Mono-Color | |
|  | A3 | A4 | A4 | | A4 | |
| Time Zone Name | Simp-lex | Simp-lex | Simp-lex | Dup-lex | Simp-lex | Dup-lex |
| Before Business | 10% | 0% | 0% | 3% | 0% | 15% |
| Before Noon | 10% | 5% | 5% | 12% | 10% | 8% |
| Lunch Time | 0% | 0% | 0% | 0% | 0% | 25% |
| After Noon | 10% | 25% | 5% | 0% | 0% | 10% |
| After Business | 20% | 0% | 5% | 0% | 20% | 5% |
| Night Time | 0% | 0% | 0% | 0% | 0% | 25% |
| Total | 8% | 5% | 2.5% | 2.5% | 5% | 14.7% |

Fig. 18

|  | Printer A | | | | Printer B | |
|---|---|---|---|---|---|---|
|  | Full-Color | | Mono-Color | | Mono-Color | |
| Time Zone Name | Average | Maximum | Average | Maximum | Average | Maximum |
| Before Business | 2 | 4 | 1 | 3 | 0 | 0 |
| Before Noon | 0 | 0 | 1 | 3 | 0 | 0 |
| Lunch Time | 2 | 5 | 2 | 6 | 2 | 4 |
| After Noon | 3 | 8 | 2 | 5 | 4 | 10 |
| After Business | 2 | 5 | 2 | 5 | 3 | 8 |
| Night Time | 0 | 0 | 0 | 0 | 0 | 0 |
| Total | 2.2 | 5.5 | 1.5 | 5.5 | 3 | 7.3 |

NETWORK SYSTEM, METHOD AND COMPUTER READABLE MEDIUM INCLUDING PRINT LOG GENERATION

CROSS REFERENCE TO RELATED APPLICATIONS

This application claims priority under 35 USC §119 to Japanese Patent Application No. 11-179306 filed on Jun. 25, 1999, the entire contents of which are incorporated by reference herein.

BACKGROUND OF THE INVENTION

1. Field of the Invention

The present invention relates to a network system, a method and a computer readable medium.

2. Discussion of the Background

Recently, a supervising tool for minimizing the total cost of ownership (hereinafter referred to as TCO) of a copier has been commercialized in recognition of the need to minimize both cost and charges on FAX transmission or a number of copy sheets made by a copier.

Further, a prior art supervising tool capable of supervising a number of printing sheets made by a printer, collecting a print log of a network printer in a client computer, storing the print log in a server, and aggregating the stored print log has also been commercialized. With this supervising tool, a print log can be aggregated per department of a company or printer, when the print logs are collected.

However, even though analysis of a time period when a printer is frequently utilized and applications frequently used are required, the above-mentioned conventional supervising tool for supervising a number of prints is incapable of executing such analysis.

SUMMARY OF THE INVENTION

Accordingly, an object of the present invention is to address and resolve such problems and provide a network system including a print log generating device, provided in a client computer, and configured to generate a print log having printer usage contents when a printing request is made in the client computer, a print log storing device configured to store the print log therein, a collecting device configured to collect the print log in a computer server, and an aggregating device configured to aggregate the usage contents per prescribed category.

According to one aspect of the present invention, a display apparatus configured to display a result of the aggregation is connected to the network.

According to another aspect of the present invention, a name of the printer, a print requesting time period and a name of an application are included in the printer usage contents.

According to another aspect of the present invention, the prescribed category is a time period when a print request is made, or an application with which a printer is used.

According to another aspect of the present invention, the print log generating device and the print log-storing device are provided in the client computer.

According to still another aspect of the present invention, the collecting device is provided in the computer server.

According to still another aspect of the present invention, the collecting device periodically collects print log from the client computer.

According to still another aspect of the present invention, the aggregating device is provided in the supervisor computer.

According to still another aspect of the present invention, the display device is provided in the supervisor computer.

BRIEF DESCRIPTION OF THE DRAWINGS

A more complete appreciation of the present invention and many of the attendant advantages thereof will be readily obtained as the same becomes better understood by the following detailed description when considered in connection with the accompanying drawings, wherein:

FIG. 13 is an illustration of an exemplary image of a screen display displaying a result of aggregation, which is executed by the supervisor PC, of usage contents of a printer per department;

FIG. 14 is an illustration of an exemplary image of a screen displaying a result of aggregation, which is executed by the supervisor PC, of usage contents of a printer per printer;

FIG. 15 is an illustration of an exemplary image of a screen display displaying a result of aggregation, which is executed by the supervisor PC, of usage contents of a printer per application;

FIG. 16 is an illustration of an exemplary image of a screen display displaying a result of aggregation, which is executed by the supervisor PC, of usage contents of a printer per time zone;

FIG. 17 is also an illustration of an exemplary image of a screen display displaying a result of aggregation, which is executed by the supervisor PC, of usage contents of a printer per time zone; and FIG. 18 is also an illustration of an exemplary image of a screen display displaying a result of aggregation, which is executed by the supervisor PC, of usage contents of a printer per time zone.

DESCRIPTION OF THE PREFERRED EMBODIMENTS

Figure 1:
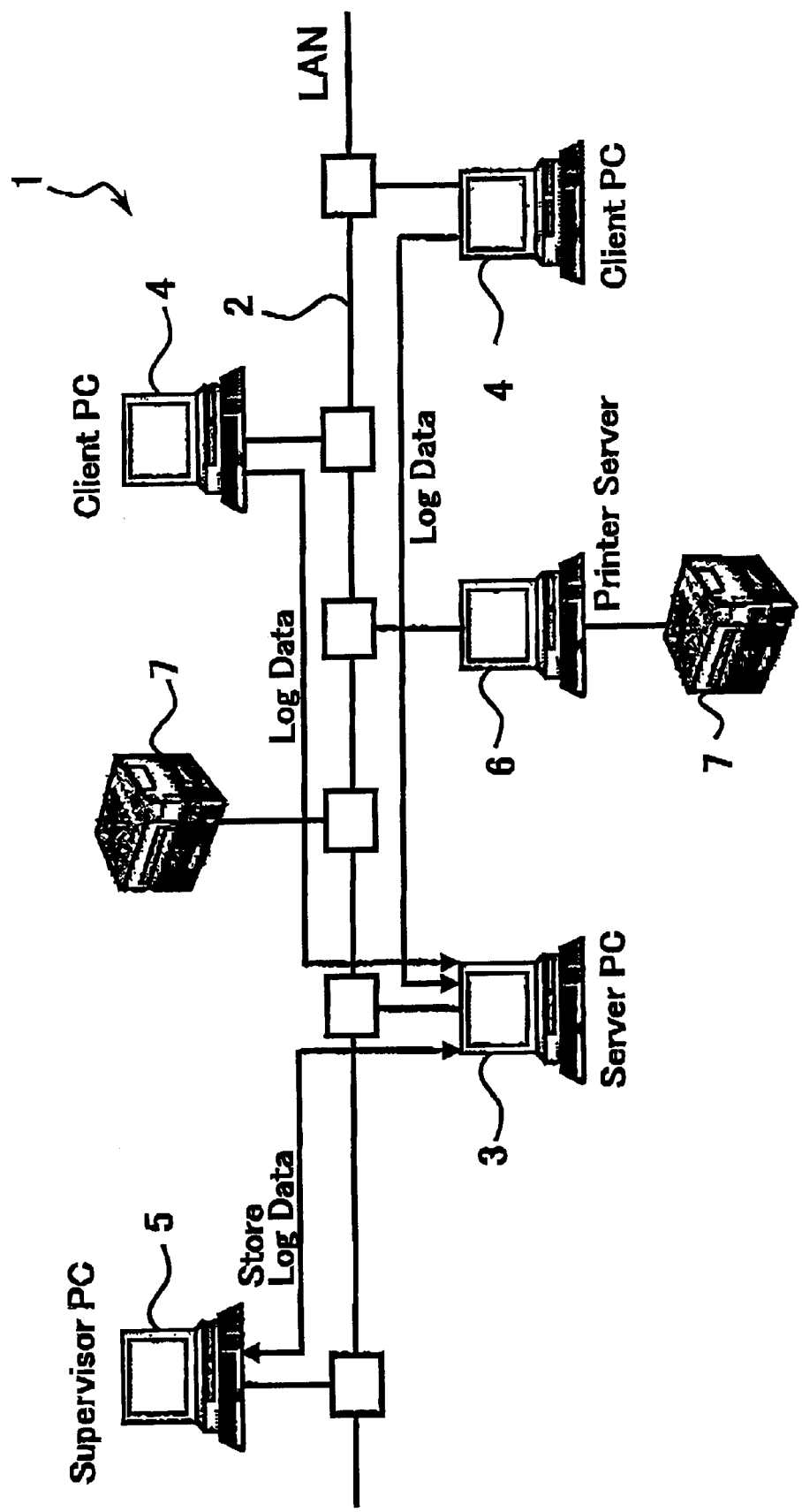
FIG. 1 is a schematic block diagram illustrating one example of a network system of the present invention.

Referring now to the drawing, wherein like reference numerals designate identical or corresponding parts throughout several views, and more particularly to FIG. 1 thereof, FIG. 1 is a schematic block chart illustrating a network system 1 according to one embodiment of the present invention. As illustrated in FIG. 1, a server personal computer (hereinafter referred to as a server PC) 3, a plurality of client personal computers (hereinafter referred to as client PCs) 4, and a supervisor personal computer (hereinafter referred to as a supervisor PC) 5 as one of client PCs 4 may be respectively connected to a LAN (Local Area Network) 2 serving as a network in this network system 1. Further, a plurality of printers 7, may be respectively connected to the LAN 2 either directly on via a printer server 6 (or other PC) as a host computer.

Figure 2:
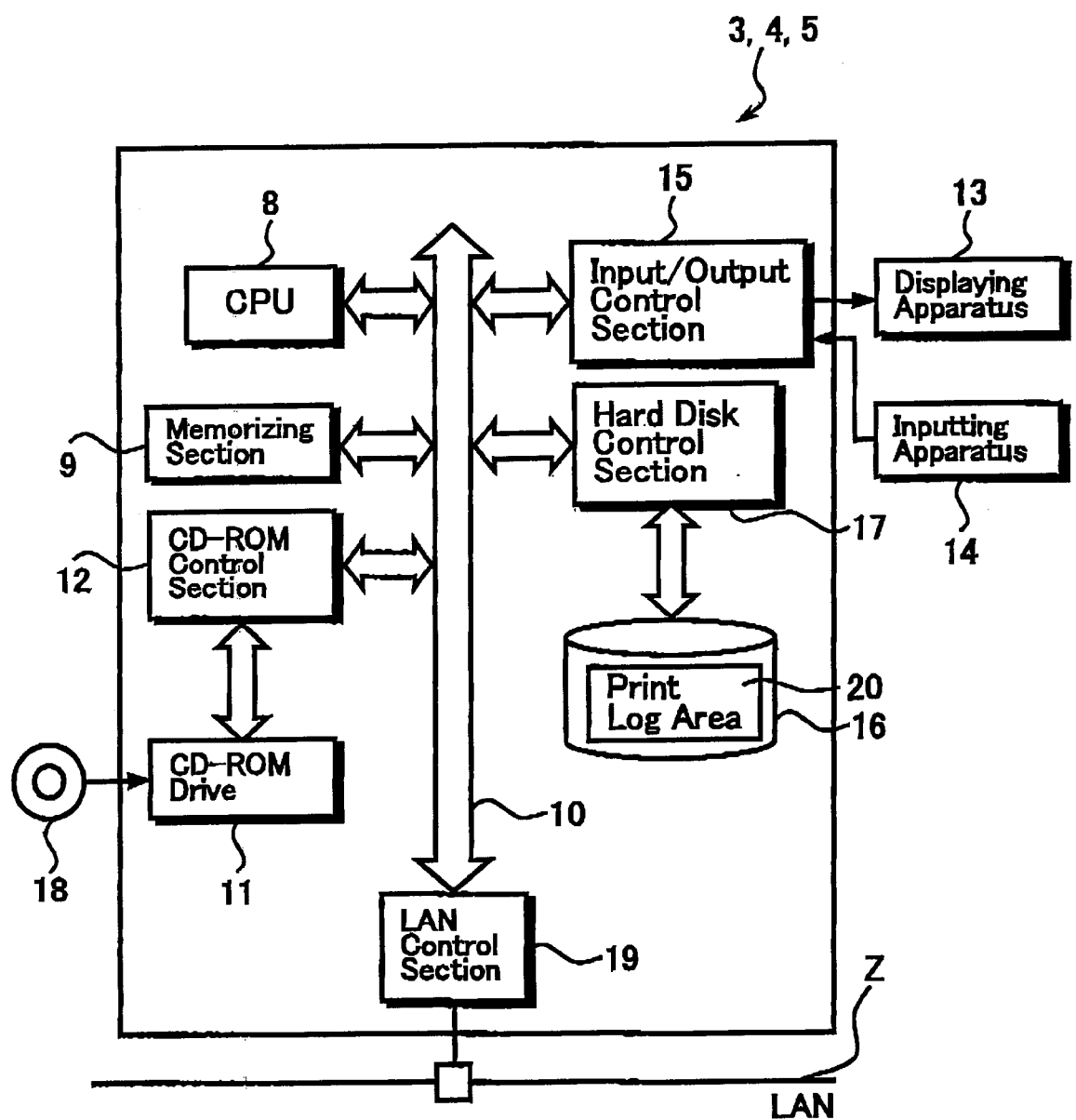
FIG. 2 is a schematic block diagram illustrating electrical connection of subsystems in a PC, such as a server PC, a client PC and a supervisor PC, of the network system.

FIG. 2 is a schematic block diagram explaining electrical connection of subsystems in the server PC 3, the client PC 4 and the supervisor PC 5. As illustrated in FIG. 2, in each PC 3, 4 and 5, a CPU (Central Processing Unit) 8 may be connected to a memory section 9 such as a ROM (Read Only Memory), a RAM (Random Access Memory), via a bus 10. Further, a CD-ROM (Compact Disc-Read Only Memory) drive control section 12 for controlling a CD-ROM drive 11 which reads a CD-ROM as a memorizing medium, and an input/output control section 15 for controlling both an input apparatus 14, such as a keyboard and a mouse, and a displaying apparatus 13, such as CRT (Cathode Ray Tube), may be connected to the bus 10. Also, a hard disc control section 17 for controlling a hard disc 16 and a LAN control section 19 for connecting the PCs 3, 4 and 5 may be connected to the LAN 2.

An operation system (hereinafter referred to as an OS), such as Windows 95/98 and Windows NT (trademarks of Microsoft Company Limited), and a variety of applications operable on the OS may be stored in each hard disc 16 of the server PC 3, client PC 4 and supervisor PC 5. Especially, a later mentioned printer-print-log-supervising tool may be utilized as one of applications. Namely, client use software of the printer print log-supervising tool may be stored in the client PC 4 from the CD-ROM 18 stored in the CD-ROM drive 11. Also, sever use software of the printer print log-supervising tool may be stored in the server PC 3 from the CD-ROM 18 stored in the CD-ROM drive 11. Further, supervisor use software of the printer print log-supervising tool ma be stored in the supervisor PC 5 from the CD-ROM 18 stored in the CD-ROM drive 11.

Figure 3:
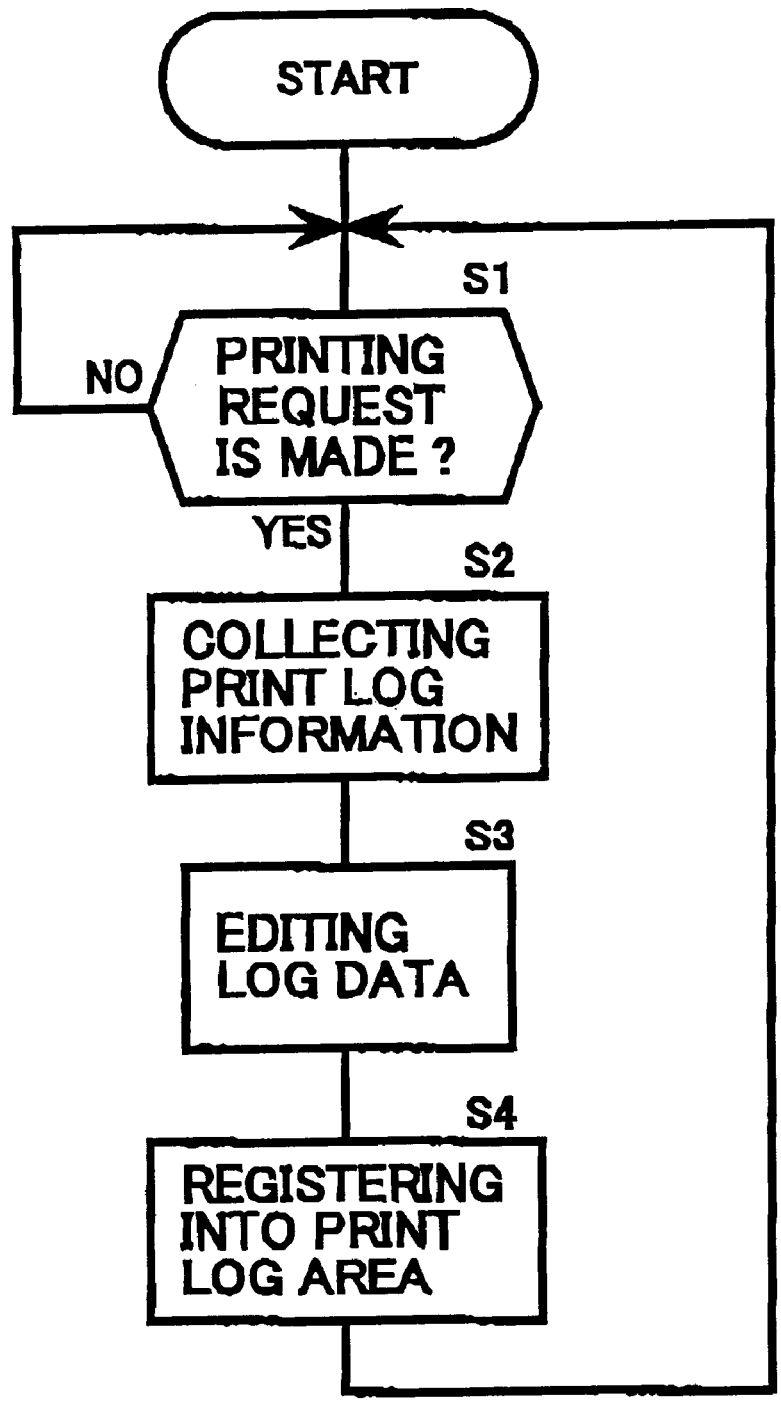
FIG. 3 is a flowchart illustrating an operation of the client PC for collecting a print log.

In the above-mentioned network system 1, an operation executed by the client PC 4 according to the client use software of the printer print log-supervising tool is explained. FIG. 3 is a flowchart illustrating such an operation. Firstly, when printing by a printer 7 is requested (in step S1) in a client PC 4 (i.e., yes in step S1), print log information may be collected (in step S2), edited (in step S3) and registered (in step S4) in a print log area 20 (refer to FIG. 2) constituted within the hard disc 16 of the client PC 4.

Figure 4:
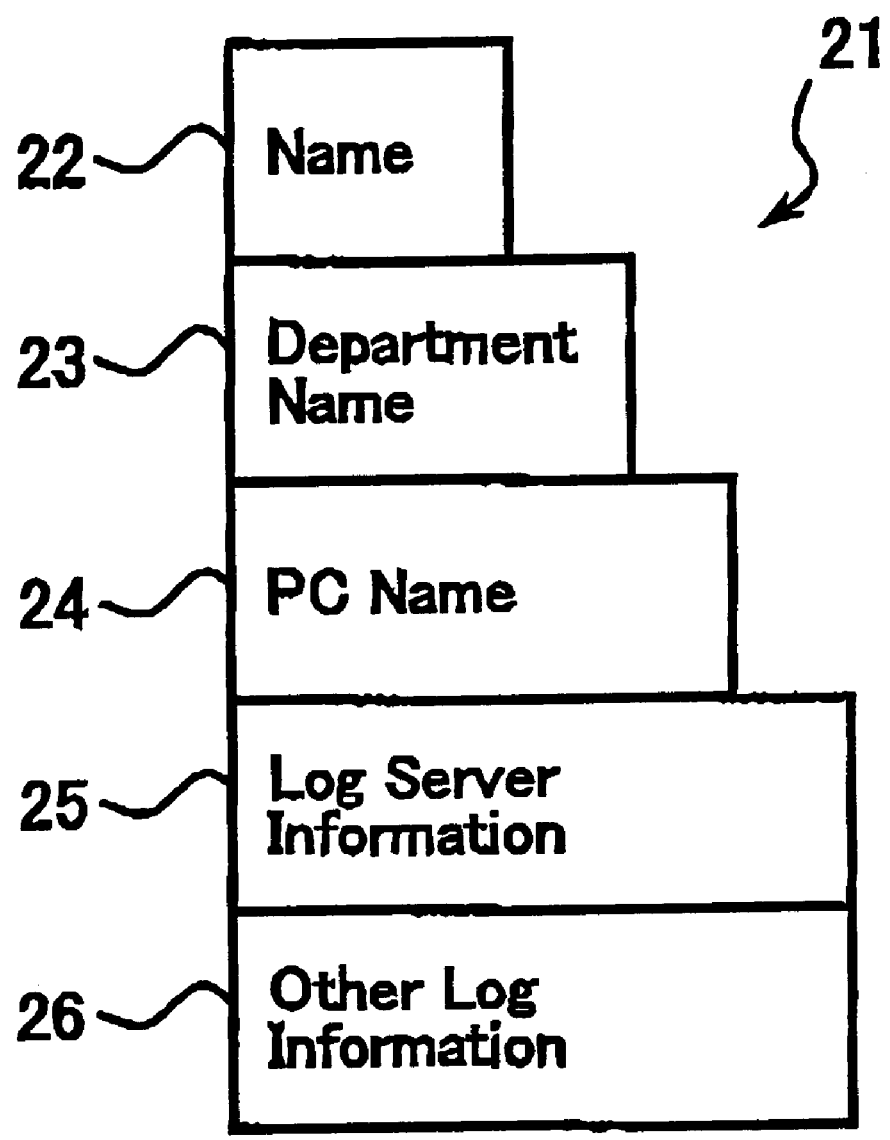
FIG. 4 is an illustration of a constitution of the print log.

FIG. 4 is a block chart illustrating a constitution of the print log. As illustrated in FIG. 4, the print log 21 may be constituted with a user name 22, a user belonging department name 23, a PC name 24 of the user using client PC 4, a log server information 25, and other log information 26. Among those, the name 22, the department name 23, the PC name 24 and the log server information 25 may be respectively constituted with user information set by a user using the supervisor PC 5.

Figure 5:
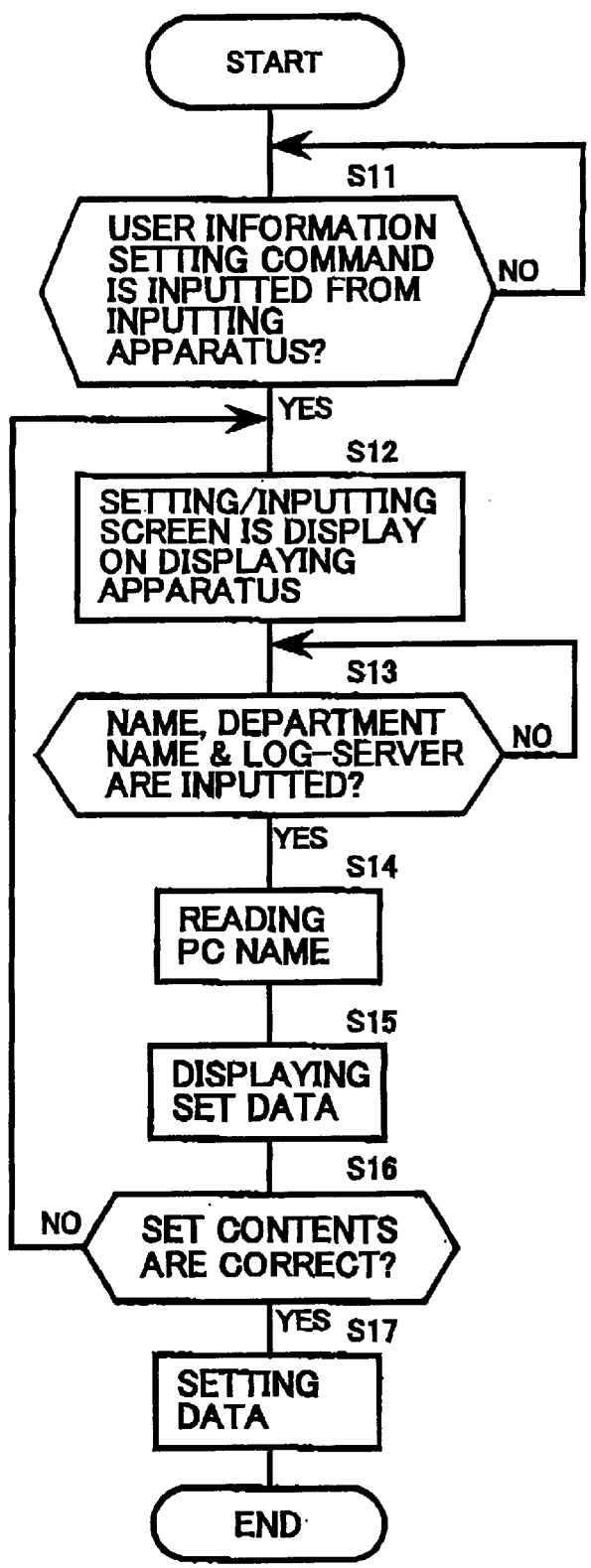
FIG. 5 is a flowchart illustrating an operation executed in the client PC for setting user information.

FIG. 5 is a flowchart for illustrating a setting operation for setting the user information. Namely, when user information setting command is inputted with an inputting apparatus 14 of the supervisor PC 5 (i.e., Yes in step S11), a user information inputting/setting screen may be displayed on a display apparatus 13 (in step S12). Thereafter, when the user inputs a name 22, a department name 23, and log server information 25 according to instruction of the inputting/setting screen (i.e., Yes in step S13), a PC name 24 of the client PC 4 may then be read (in step S14).

These set data, i.e., the name 22, the department name 23, the log server information 25 and the PC name 24 may be displayed on the display apparatus 13 (in step S15). If the set contents are correct, i.e., the user executes a prescribed operation with the inputting apparatus 14 according to the instruction on the screen (i.e., Yes in step S16), the data of the name 22, the department name 23, the log server information 25 and the PC name 24 may be stored in a prescribed area of a hard disc 16 (in step S17).

If the set contents are not correct, i.e., the user executed a prescribed operation with the inputting apparatus 14 according to the instruction on the screen in a manner different from the above (i.e., No in step S16), the process returns to step S12 and an operation may be replayed. Such a setting operation for setting user information can be executed with a supervisor use software of a printer print log supervising tool with the supervisor PC 5.

A variety of log data which can be collected from software stored in the hard disc 16 or the like of the client PC 4, may be included in the other log information 26.

Figure 6:
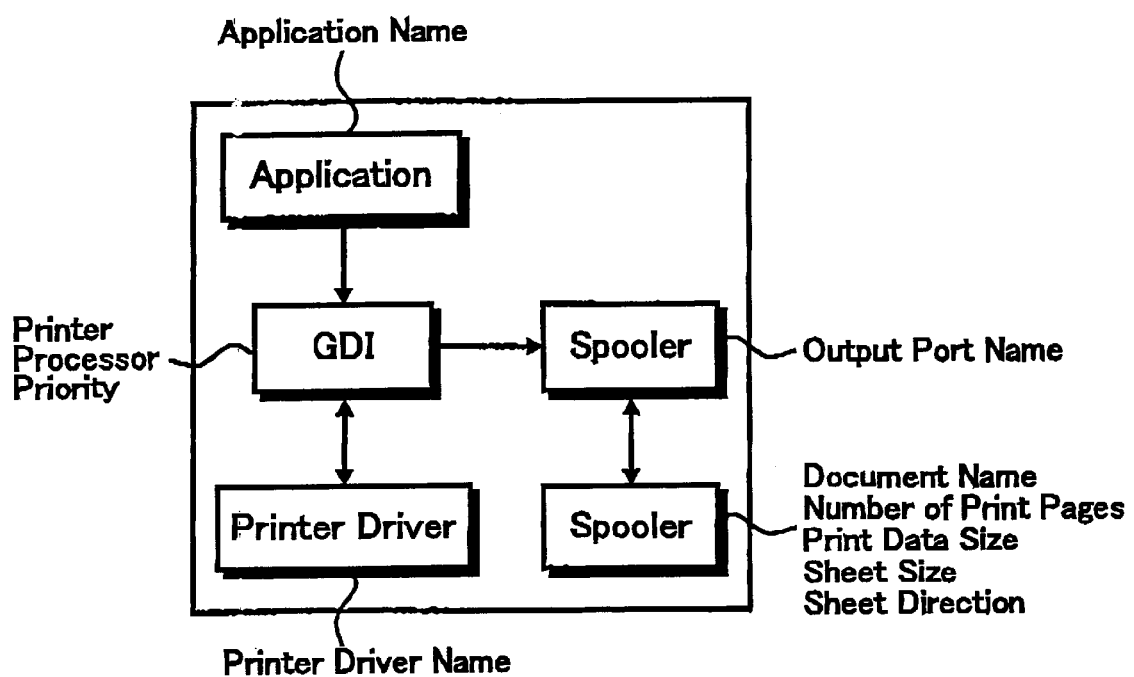
FIG. 6 is a conceptual diagram illustrating relation between a software and log data stored in the client PC.

FIG. 6 is a schematic diagram illustrating a specific operation for collecting log data of a print log. Namely, when the OS is Windows 95 or 98 and print data is conveyed from an application to a printer device via GDI, information as to the followings can be obtained: a user name, a computer name, a printer name, a printer driver name, an output destination port name, a document name, an application name, a number of print pages, sheet size, sheet direction, print resolution, monochrome/color distinction, simplex-duplex distinction, and a number of units.

As information obtainable from spooler, information as to the followings can be obtained when the OS is Windows 95 or 98. Namely, a print data size, print requesting time period, a print start time period, a print terminating time period, status, an output form, a print processor and priority can be obtained. When the OS is Windows NT 4.0, information such as a user name, a computer name, a printer name, a printer driver name, an output destination port name, a document name, an application name, a number of print pages, sheet size, sheet direction, print resolution, monochrome/color distinction, simplex/duplex distinction, and a number of units, print data size, a print requesting time period, a print start time period, a print terminating time period, status, an output form, a processor and priority can be obtained.

The print log collected in step S2 and stored in the print log area 20 of the client PC 4 in step S4 may be periodically transmitted to the server PC 3. Such an operation is next described.

Figure 7:
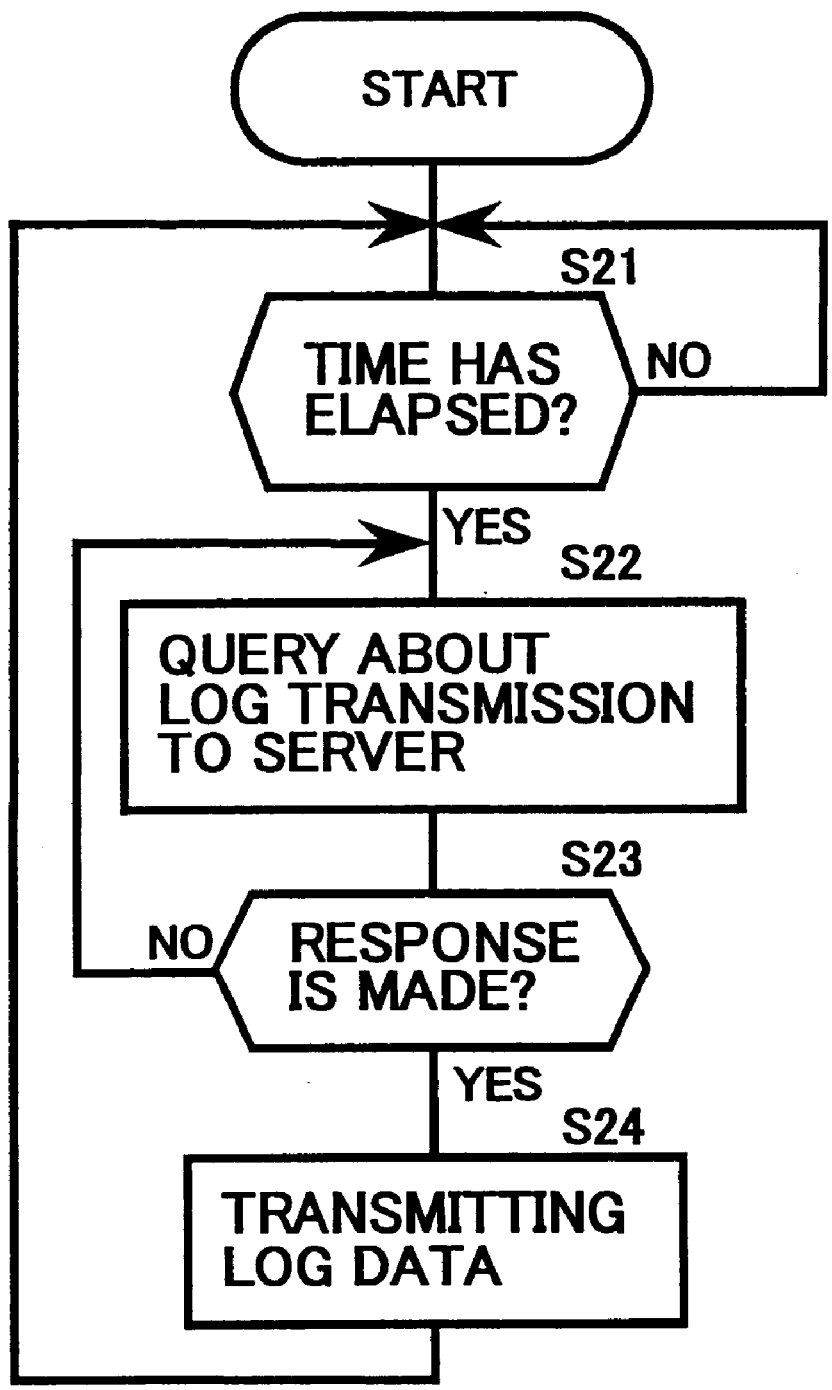
FIG. 7 is a flowchart illustrating an operation of the client PC for periodically transmitting a print log to the server PC.

FIG. 7 is a flowchart illustrating an operation of the client PC 4 for periodically transmitting print log to the server PC 3. As illustrated in FIG. 7, when a prescribed time has elapsed (i.e., Yes in step S21), inquiry is made whether no problem may occur if log data is transmitted is made to the sever PC 3 (in step S22). This inquiry may be repeated (i.e., NO in step S21) until the sever PC 3 responds (in later mentioned step S23). If the response is made (i.e., Yes in step S23), log data of the print log may be transmitted (in step S24).

Figure 8:
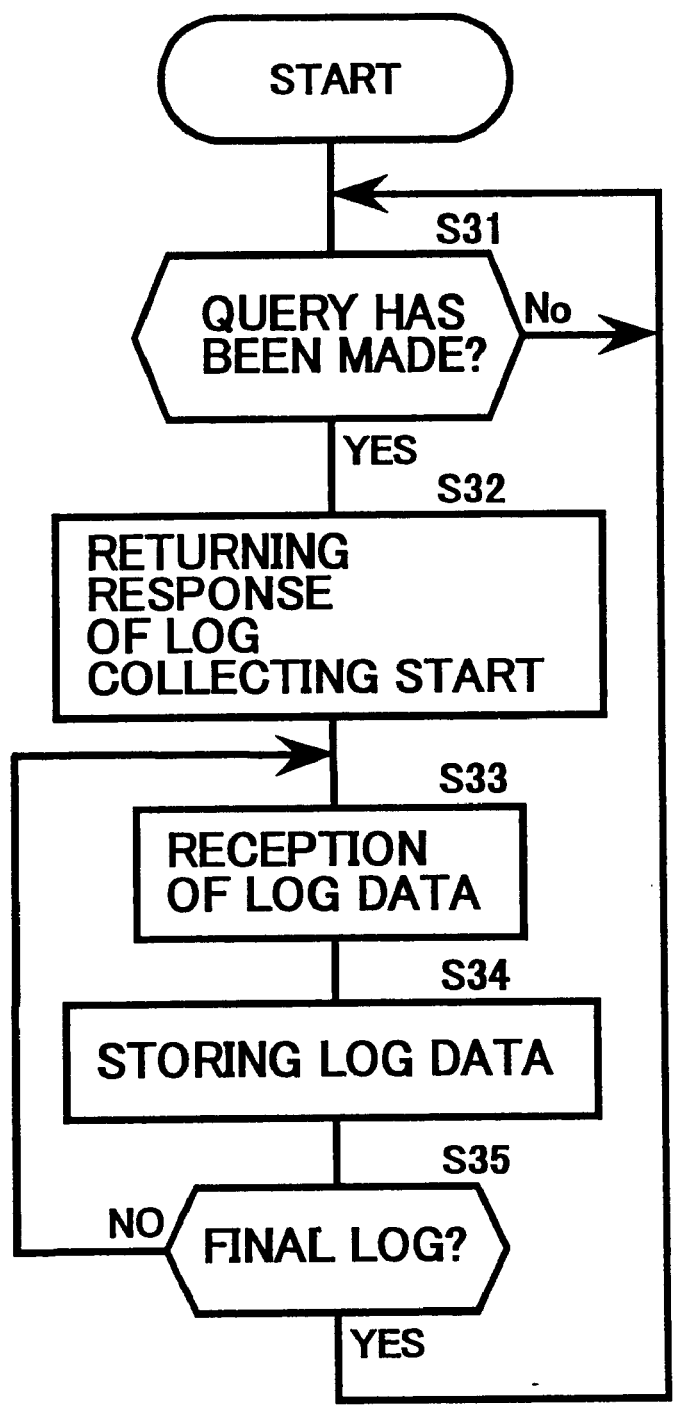
FIG. 8 is a flowchart illustrating an operation of the server PC for periodically receiving a print log from the client PC.

FIG. 8 is a flowchart illustrating an operation of the server PC 3 for periodically receiving the print log from the client PC 4. Namely, as illustrated in FIG. 8, when inquiry (in step S31) is made from the client PC 4 (in step S31), it may return a response representing the collection of log data is commenced to the client PC 4 (in step S32). Then, it may receive the log data of the print log from the client PC 4 (in step S33), and may store the print log in a print log area 20 (refer to FIG. 2) constituted in the hard disc 16 of the server PC 3 (in step S34). Such operation may be reported until the final log (i.e., No in step S35). The process may return to step S31 when the final log data has been stored in the print log area 20 (i.e., Yes in step S35). Further, the print log may be directly entered into database when it is stored in the print log area 20 of the server PC 3, Thus, a collecting device can be realized by the above-mentioned operation executed in step S34.

Figure 9:
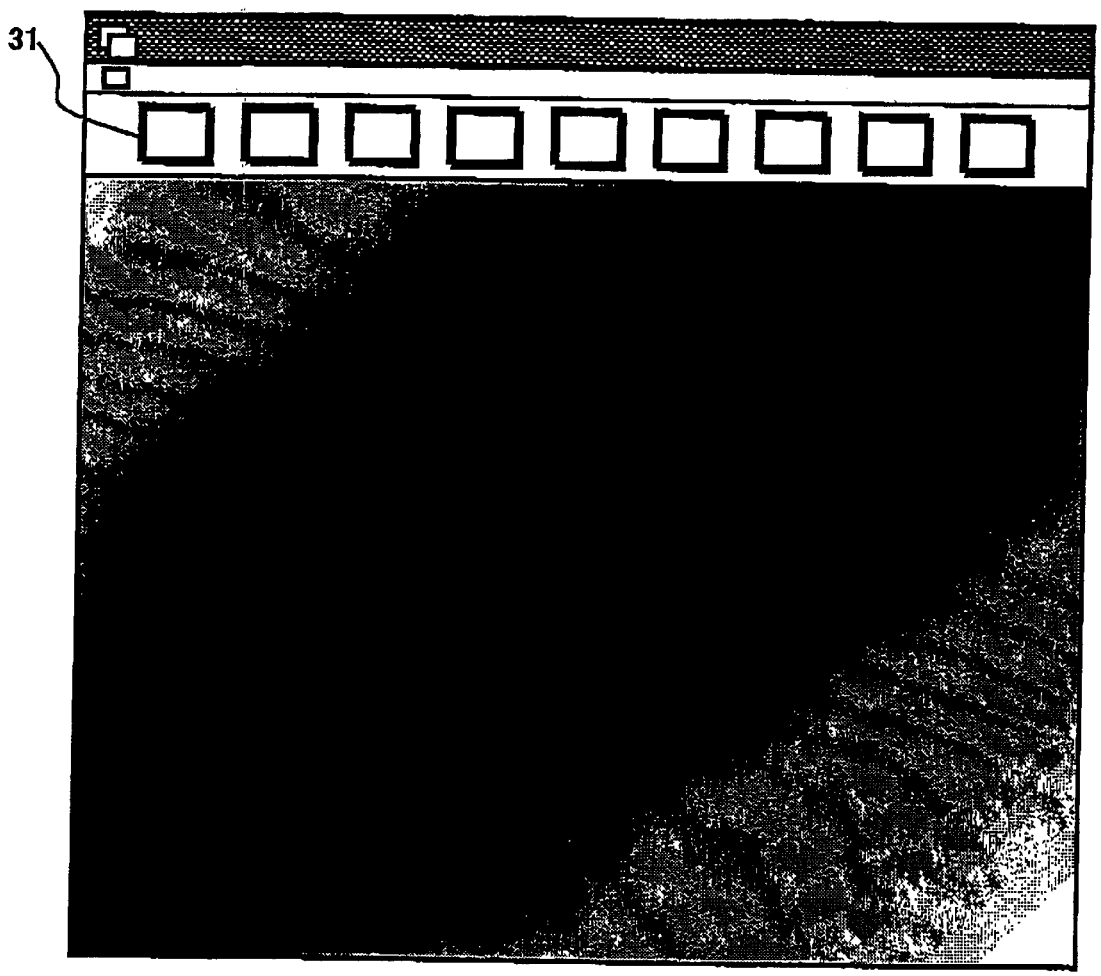
FIG. 9 is an illustration of one example of an operation screen displayed on a displaying apparatus of the supervisor PC.

FIG. 9 illustrates an example of an operation screen displayed on a displaying apparatus 13 of the supervisor PC 5 using supervisor use software of a printer print log supervising tool. This supervisor use software may operate on the Windows 98 OS. The supevisor PC 5 may start an operation illustrated in FIG. 10 when an intake icon 31 is clicked through the operation screen illustrated in FIG. 9.

Figure 10:
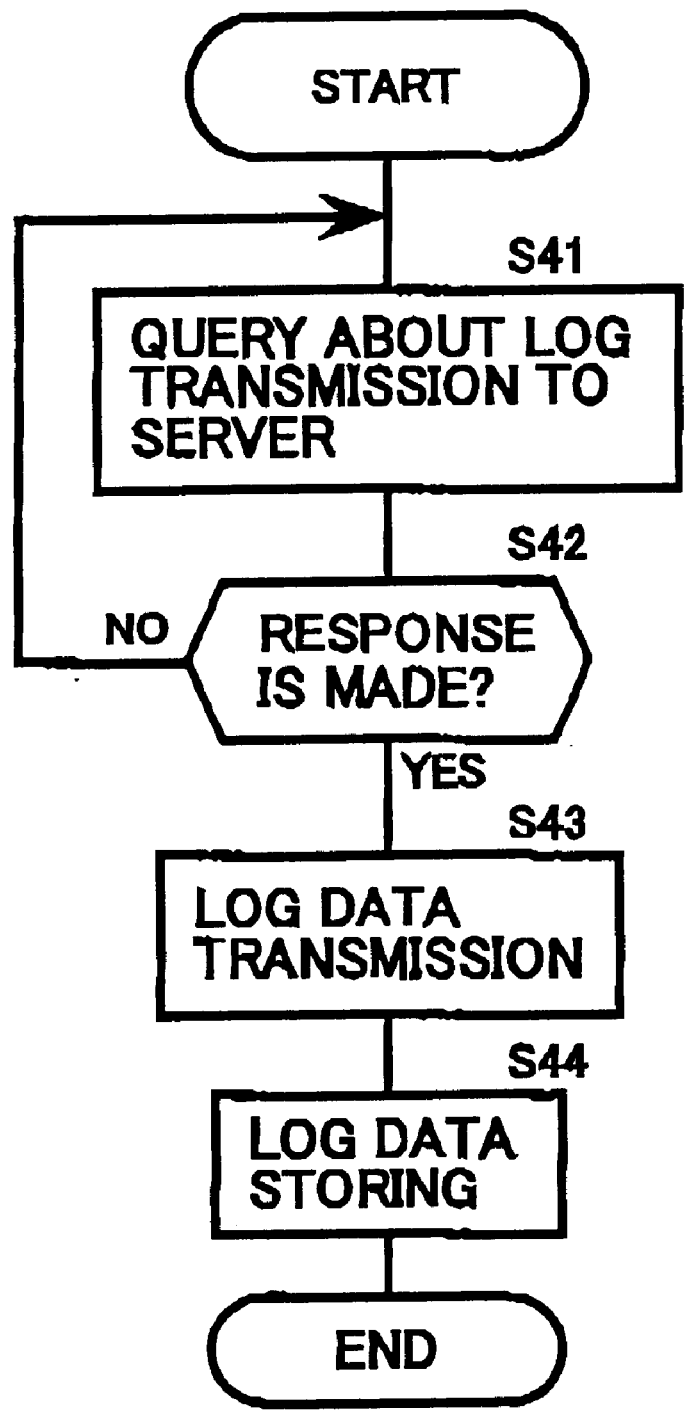
FIG. 10 is a flowchart illustrating an operation of the supervisor PC for taking a print log.

Namely, as illustrated in FIG. 10, an inquiry as a request for transmitting log data may be made to the server PC 3 (in step S41). This inquiry may be repeated (i.e., No in step S42) until a response is made from the server PC 3 (i.e., Yes in step S42). When the response is made (i.e., Yes in step 42), log data of a print log may be transmitted (in step S43) and stored in a print log area 20 (refer to FIG. 2) constituted in a hard disc 16 of the supervisor PC 5 (in step S44).

Figure 11:
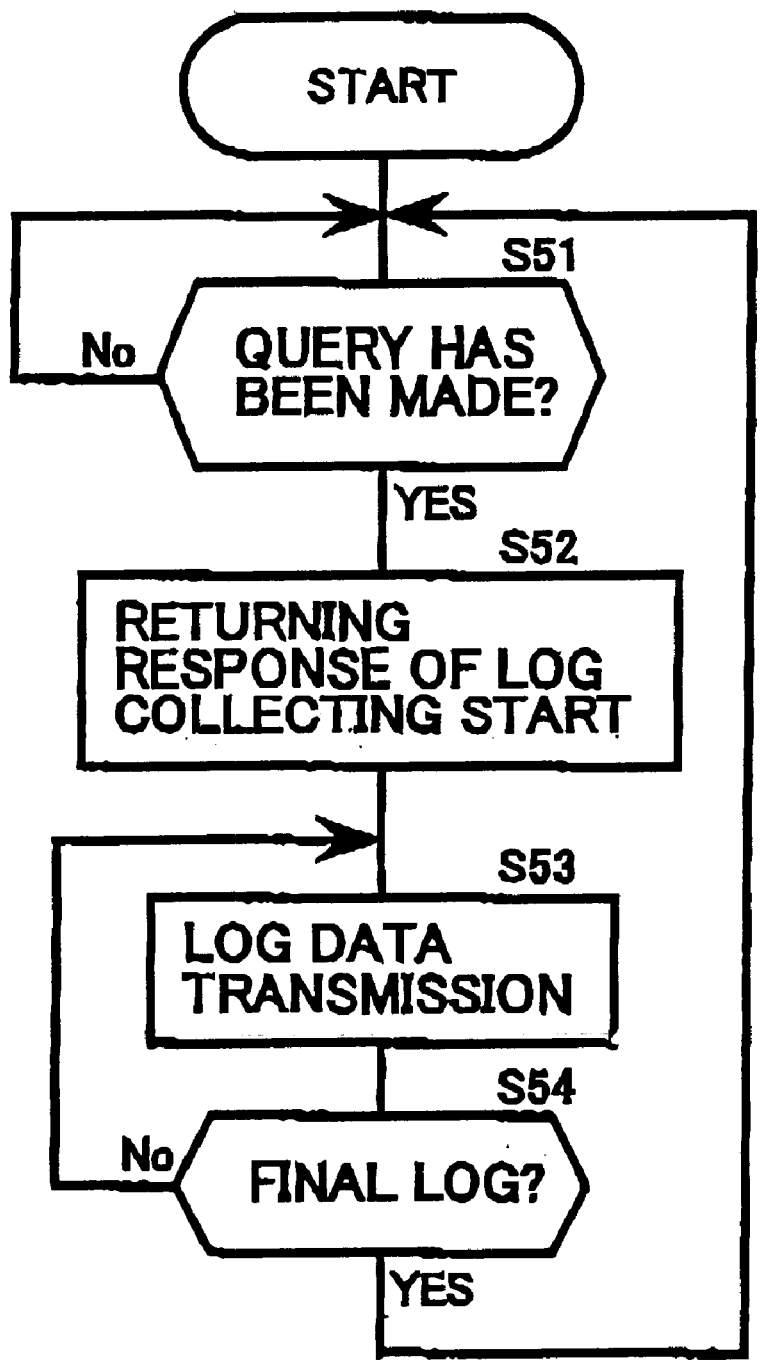
FIG. 11 is a flowchart illustrating an operation of the server PC for transmitting a print log to the supervisor PC.

An operation executed by the server PC 3 in the above-mentioned situation is now described. Namely, as illustrated in FIG. 11, when inquiry is received from the supervisor PC 5 (i.e., Yes in step S51), it may return a response indicating start of collecting print log (in step S52). Then, it may transmit the log data of the print log stored in the print log area 20 of the server PC 3 to the supervisor PC 5 (in step S53). This transmission is continued until the final log (i.e., No in step S54); a process may return to step S51 when the final log has been transmitted (i.e., Yes in step S54).

Figure 12:
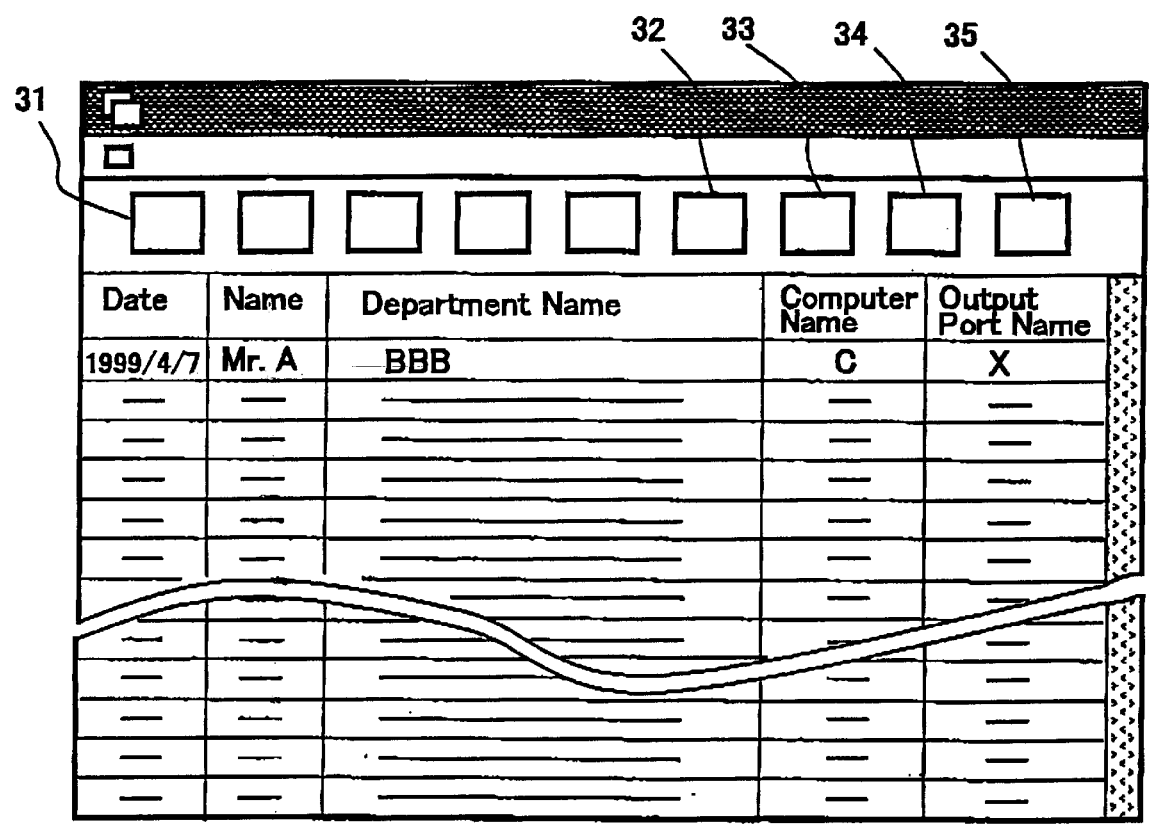
FIG. 12 is an illustration of an example of a print log stored in the supervisor PC and displayed on the displaying apparatus of the supervisor PC.

FIG. 12 illustrates an example of a display of a print log (having been entered into database in the server PC 3) stored in the print log area 20 of the supervisor PC 5 and displayed on the displaying apparatus 13 of the supervisor PC 5.

In the screen illustrated in FIG. 12, usage contents of the printer 7 can be aggregated as desired when one of the following icons is clicked and the operation illustrated in FIG. 10 is executed based on the log data of the print log stored in the print log area 20 of the supervisor PC 5. Such icons may include a department icon 32, a printer icon 33, an application icon 34, and a time zone icon 35. Namely, an aggregation device can be realized.

Firstly, a prescribed wizard screen may be displayed when the department icon 32 is clicked. Usage contents of a printer 7 may be aggregated per department of a business establishing employing the network system 1 based on a print log collected by the server PC 3, when an operation is executed according to instruction of the wizard display. FIG. 13 illustrates an example of an image of a screen display displaying the result of the aggregation per department. An aggregation result of a third development department may be displayed in the example of FIG. 13.

Further, when the printer icon 33 is clicked, a prescribed wizard screen may be displayed. Usage contents of a printer 7 may be aggregated per printer connected to the network system 1 based on print log collected by the server PC 3, when an operation is executed according to instructions of the wizard screen. FIG. 14 is an example showing an image of a screen display displaying a result of the aggregation per printer 7. In the example of FIG. 14, an aggregation result of a printer named A may be displayed.

Further, when the application icon 34 is clicked, a prescribed wizard screen may be displayed. Usage contents of a printer 7 may be aggregated per application utilized in the network system 1 based on a print log collected by the server PC 3, when an operation is executed according to instruction on the wizard screen. FIG. 15 is an example showing an image of the screen display displaying a result of the aggregation per application. In the example of FIG. 15, aggregation results of applications of a word processor A and a table calculation B may be displayed.

Further, when the time zone icon 35 is clicked, a prescribed wizard screen may be displayed. Usage contents of the printer 7 may be aggregated per time zone based on a print log collected by the server PC 3, when an operation is executed according to instruction on the wizard screen. Aggregation can be executed in three ways when a prescribed operation is executed on the wizard screen.

Namely, as a first example, print requesting time periods included in print log as log data are classified into time zone sorts, and a number of printed pages printed during applicable term can be accumulated and aggregated. FIG. 16 is an example showing an image of a screen display showing an aggregation result in the case.

As a second example, print requesting time periods included in print log as log data may be classified into time zone sorts, and an operation rate during an applicable term can be aggregated in average. FIG. 17 is an example showing an image of a screen display showing an aggregation result in the case. The operation rate may be calculated as follows and represented by percentage, based on the following relationship:

$$\frac{A}{B \cdot C} \times 100\%, \text{ where}$$

A=accumulated print operating time period,
B=a period of a time zone,
C=a number of aggregation executed days.

Third, print requesting time periods included in print log as log data may be classified into time zone sorts, and an average and maximal value of a waiting time period during an applicable term can be aggregated. FIG. 18 is an example showing an image of the screen display showing an aggregation result in the case. The average may be calculated as follows:
(Accumulated print waiting time period/a number of printed times)

According to the above described network system 1, since usage contents of a printer 7 can be aggregated per time zone based on print log collected, a time zone when the printer 7 is frequently utilized can be readily determined.

Further, since usage contents of a printer 7 can be aggregated per application utilized in the network system 1 based on collected print log, an application, with which the printer 7 is frequently utilized, can be readily determined.

Since the invention above described can aggregate usage contents of a printer per time zone based on collected print log, a time zone when a printer is frequently used can be readily determined.

Since the present invention can aggregate usage contents per application utilized in a network of a printer, an application, with which a printer is frequently utilized, can be readily determined.

Since the present invention can aggregate usage contents per time zone, a time zone when a printer is frequently utilized can be readily determined.

Since the present invention can aggregate usage contents per application utilized in the network of a printer, an application, with which a printer is frequently utilized, can be readily determined.

The invention can aggregate usage contents based on collected print log per time zone, a time zone when a printer is frequently utilized can be readily determined.

Since the invention can aggregate usage contents based on print log collected in a network system of a printer, an application with which a printer is frequently utilized can be readily determined.

Numerous modifications and variations of the present invention are possible in light of the above teachings. It is therefore to be understood that within the scope of the appended claims, the present invention may be practiced otherwise that as specifically described herein.

What is claimed as new and desired to be secured by Letters Patent of the United States is:

1. A network system comprising:
    at least one computer server;
    at least one client computer having a printer respectively connected to a network,
    a print log generating device configured to generate a print log having printer usage contents that includes software used by a client when a printing request is made in said at least one client computer;
    a print log storing device configured to store the print log;
    a collecting device configured to collect said print log from said at least one client computer; and
    an aggregating device configured to aggregate usage contents of the printer per a prescribed category, wherein
    said print log generating device and said print log storing device are provided in said at least one client computer, and
    said collecting device is provided in said at least one computer server.

2. A network system as claimed in claim 1, further comprising a display apparatus configured to display a result of the aggregation.

3. A network system as claimed in claim 1, wherein said printer usage contents include a name of the printer, a print requesting time period and a name of an application.

4. A network system as claimed in claim 1, wherein said category is a time zone when a print request is made.

5. A network system as claimed in claim 1, wherein said category is an application with which a printer is used.

6. A network system as claimed in claim 1, wherein said collecting device periodically collects the print log from said client computer.

7. A network system as claimed in claim 1, wherein said aggregating device is provided in at least one supervisor computer.

8. A network system as claimed in claim 1, wherein said display device is provided in at least one supervisor computer.

9. A method for aggregating usage contents of a printer of each client computer connected to a network system, comprising:
    generating a print log including a software used by a client when a print request is made in a client computer;
    storing said print log;
    collecting said print log from the client computer; and
    aggregating the print log per prescribed category, wherein
    the print log is generated and stored in the client computer, and
    the print log is collected by at least one computer server.

10. A method as claimed in claim 8, wherein said category is a time zone when a printer is utilized.

11. A method as claimed in claim 8, wherein said category is an application with which a printer is utilized.

12. A computer readable medium readable for at least one computer server and at least one client computer respectively connected to a network system, said medium storing a program for enabling the at least one client computer to collect a print log having printer usage contents that include a software used by a client, and the at least one server computer to collect the print log from the at least one client computer and to aggregate the printer usage contents per prescribed category, wherein
    the print log is generated and stored in the at least one client computer, and
    the print log is collected by the at least one computer server.

13. A medium as claimed in claim 12, wherein said printer usage contents include a name of the printer, a print requesting time period and a name of application.

14. A medium as claimed in claim 12, wherein said category is a time zone when a print request is made.

15. A medium as claimed in claim 12, wherein said category is an application with which a printer is used.

16. A network system comprising:
    at least one computer server,
    at least one client computer having a printer respectively connected to a network;
    print log generating means for generating a print log having printer usage contents including a software used by a client when a printing request is made in said at least one client computer;
    print log storing means for storing the print log;
    collecting means for collecting said print log from said at least one client computer; and
    aggregating means for aggregating usage contents of the printer per prescribed category, wherein
    said print log generating means and said print log storing means are provided in said at least one client computer, and
    said collecting means is provided in said at least one computer server.

17. A network system as claimed in claim 16, further comprising displaying means for displaying a result of the aggregation.

18. A network system as claimed in claim 16, wherein said printer usage contents include a name of the printer, a print requesting time period and a name of an application.

19. A network system as claimed in claim 16, wherein said category is a time zone when a print request is made.

20. A network system as claimed in claim 2, wherein said printer usage contents include a name of the printer, a print requesting time period and a name of an application.

21. A network system as claimed in claim 17, wherein said printer usage contents include a name of the printer, a print requesting time period and a name of an application.

* * * * *